(12) United States Patent
Ohkubo

(10) Patent No.: US 6,445,338 B1
(45) Date of Patent: Sep. 3, 2002

(54) DETECTING APPARATUS OF VEHICLE SPEED

(75) Inventor: Masashi Ohkubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/948,237

(22) Filed: Sep. 7, 2001

(30) Foreign Application Priority Data

Sep. 11, 2000 (JP) ......................................... 2000-274652

(51) Int. Cl.[7] ........................... G01S 13/60; G01S 15/50
(52) U.S. Cl. ......................................... 342/104; 367/91
(58) Field of Search ............................. 367/89, 90, 91; 342/70, 104; 180/167, 169

(56) References Cited

U.S. PATENT DOCUMENTS 4,354,191 A * 10/1982 Matsumura et al. ........ 342/104
5,696,515 A * 12/1997 Zyren et al. ................. 342/104
5,751,241 A * 5/1998 Lewiner et al. ............. 342/104

* cited by examiner

Primary Examiner—Ian J. Lobo
(74) Attorney, Agent, or Firm—Jay H. Maioli

(57) ABSTRACT

A detecting apparatus of vehicle speed including detecting means for emitting an electromagnetic wave or an ultrasonic wave to a road surface and detecting traveling speed of a vehicle from the Doppler effect produced in a reflected wave thereof, a transmitting circuit for sending information about the traveling speed detected by the detecting means by radio, a power generation mechanism for generating power by vibration produced in the vehicle, and a charging circuit for charging a charging type battery by an output voltage of the power generation mechanism.

4 Claims, 3 Drawing Sheets

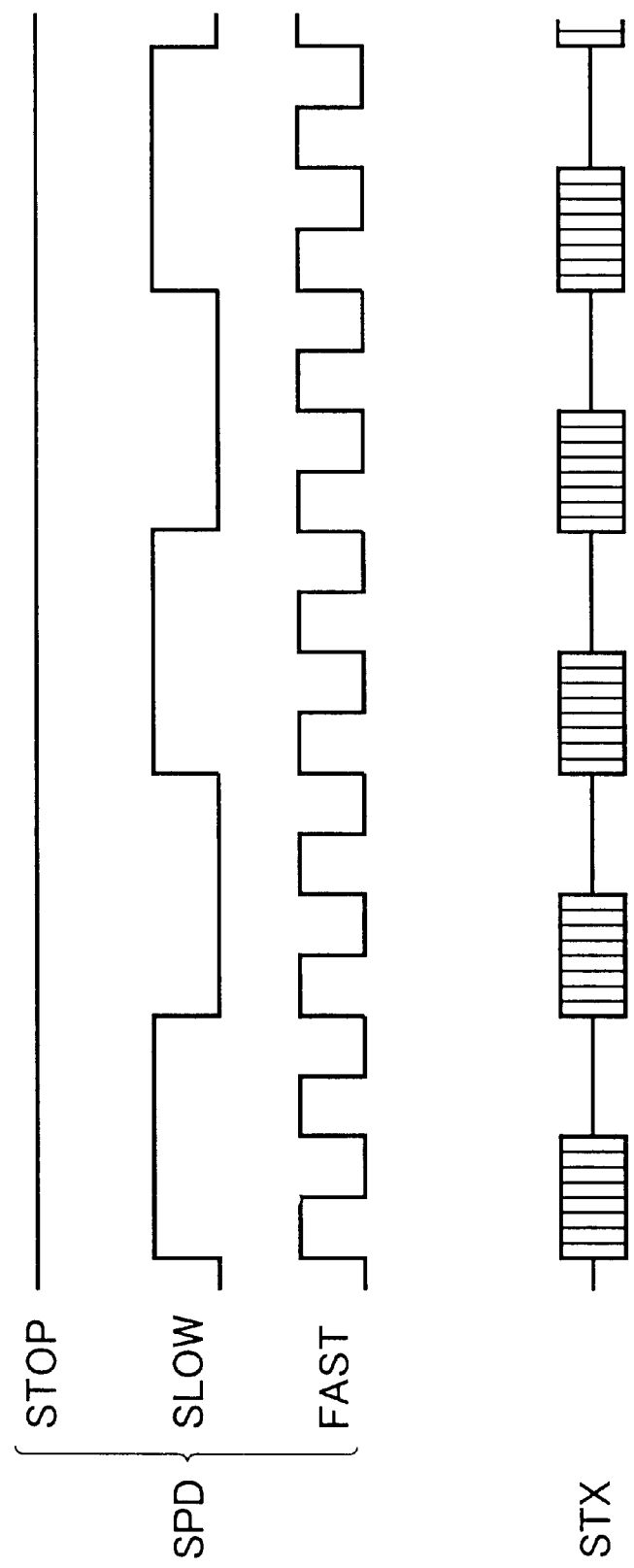

DETECTING APPARATUS OF VEHICLE SPEED

BACKGROUND OF THE INVENTION

1. Field of the Invention

The present invention relates to a detecting apparatus of vehicle speed preferably used in a navigation apparatus for vehicle mounting or the like.

2. Description of the Related Art

A navigation apparatus for vehicle mounting is constituted as shown by, for example, FIG. 1. That is, in FIG. 1, there is provided a microcomputer 10 as a control circuit for controlling operation of a total of the navigation apparatus. The microcomputer 10 includes CPU (Central Processing Unit) 11 for executing various programs, ROM (Read Only Memory) 12 written with the programs, RAM (Random Access Memory) 13 for work area and an involatile memory 14 for holding various data and further includes an interface circuit 16 and an LCD (Liquid Crystal Display) controller 17, which are connected to each other via a system bus 19.

Further, the interface circuit 16 is connected with various operation keys (operation switches) 15 and the LCD controller 17 is connected with a color LCD 18.

Further, the navigation apparatus of FIG. 1 is a case of further using DVD (Digital Versatile Disc)—ROM 21 as medium of large capacity having map data, that is, DVD-ROM 21 is contained with various map data necessary for navigation. Further, there is provided a DVD-ROM drive apparatus 22 for reading data from DVD-ROM 21 and the drive apparatus 22 is connected to the system bus 19.

Further, radio wave from a navigation satellite, for example, a GPS (Global Positioning System) satellite is received by a GPS antenna 23 and a received signal thereof is supplied to a GPS unit (receiving circuit) 24, data of a position of its own is outputted from the GPS unit 24 and the data is supplied to the microcomputer 10.

Further, a self-containe[0084] navigatio[008e] unit, for example, a gyro 25 is provided, data in a direction of moving the vehicle per se is outputted from the gyro 25 and the data is supplied to the microcomputer 10. Further, a vehicle speed sensor for detecting traveling speed of the vehicle is provided and an output signal thereof is supplied to the microcomputer 10.

According to such constitution, output signals from the GPS unit 24, the gyro 25 and the vehicle speed sensor 26 are processed by CPU 11 to thereby determine a position of the vehicle of its own and map data of a map including the position of the vehicle of its own is read from DVD-ROM 21. Further, LCD 18 displays an electronic map centering on a vicinity of the position of the vehicle of its own in accordance with the read map data and displays, for example, a triangular mark (Δ) indicating the vehicle of its own at the position of the vehicle of its own.

Further, in this case, the position of the vehicle of its own can be determined with considerable accuracy only by the GPS unit 24; however, radio wave from the GPS satellite may not be received behind a building or in a tunnel. In such an occasion, determination of the position of the vehicle of its own becomes inaccurate or cannot be carried out at all.

Hence, the navigation apparatus of FIG. 1 is provided with the gyro 25 and the vehicle speed sensor 26, thereby, even when radio wave from the GPS satellite cannot be received, the position of the vehicle of its own can be determined.

Further, as a method of detecting the traveling speed of the vehicle by the vehicle speed sensor 26, there are reduced into practice:

(1) outputting a speed signal from a signal cable reaching a speedometer of the vehicle;

(2) detecting rotational speed of tire, that is, traveling speed by magnetizing tire by a magnet and detecting the magnetism by a magnetic sensor.

However, in the case of the method in item (1), it is considerably difficult for a general user to execute operation for the reasons of:

it is necessary to strip an inner lining of the vehicle;

wiring of the signal cable differs by vehicle kind;

it is necessary to find the signal cable from a number of similar cables.

Therefore, sales routes of navigation apparatus are limited to special stores and expensive attaching fee is needed, which constitutes factors for hampering spread of the navigation apparatus.

Further, in the case of the method in item (2), a power supply cable and a signal cable are needed for the magnetic sensor and these cables must be led between the magnetic sensor arranged at outside of the vehicle and the navigation apparatus arranged at inside of the vehicle, and so the operation requires time and labor. Further, since tire cannot be magnetized strongly, the magnetic sensor for detecting the magnetism needs to be provided with high sensitivity. As a result, error is increased when the vehicle is passing a steel bridge or traveling at a vicinity of a railroad.

SUMMARY OF THE INVENTION

It is an object of the invention to solve the above-described problem.

According to an aspect of the invention, there is provided, for example, a detecting apparatus of vehicle speed comprising:

detecting means for emitting an electromagnetic wave or an ultrasonic wave to a road surface and detecting traveling speed of a vehicle from the Doppler effect produced in a reflected wave thereof;

a transmitting circuit for sending information about the traveling speed detected by the detecting means by radio;

a power generation mechanism for generating power by vibration produced in the vehicle; and a charging circuit for charging a charging type battery by an output voltage of the power generation mechanism;

wherein voltage of the charging type battery is supplied to the detecting means and the transmitting circuit as operating voltage thereof.

Therefore, it is not necessary to connect a power supply cable to the speed detecting apparatus, and it is not necessary to connect a cable for informing the navigation apparatus of the detected traveling speed, and so the transmission becomes wireless. Accordingly, attachment of the speed detecting apparatus to the vehicle is simplified. Further, it is not that the sales routes are limited to special stores or expensive attachment fee is needed as in the conventional navigation apparatus, and the speed detecting apparatus can be sold in a general household electric appliance store and is expedited to spread. Further, detection of vehicle speed can be carried out with high accuracy.

Further, when the vehicle is disposed in a garage or a parking lot and does not travel, consumption of the charging type battery constituting a source of operating voltage can be saved.

BRIEF DESCRIPTION OF THE DRAWINGS

FIG. 3 is a waveform diagram for explaining the invention.

DESCRIPTION OF THE PREFERRED EMBODIMENTS

Figure 2:
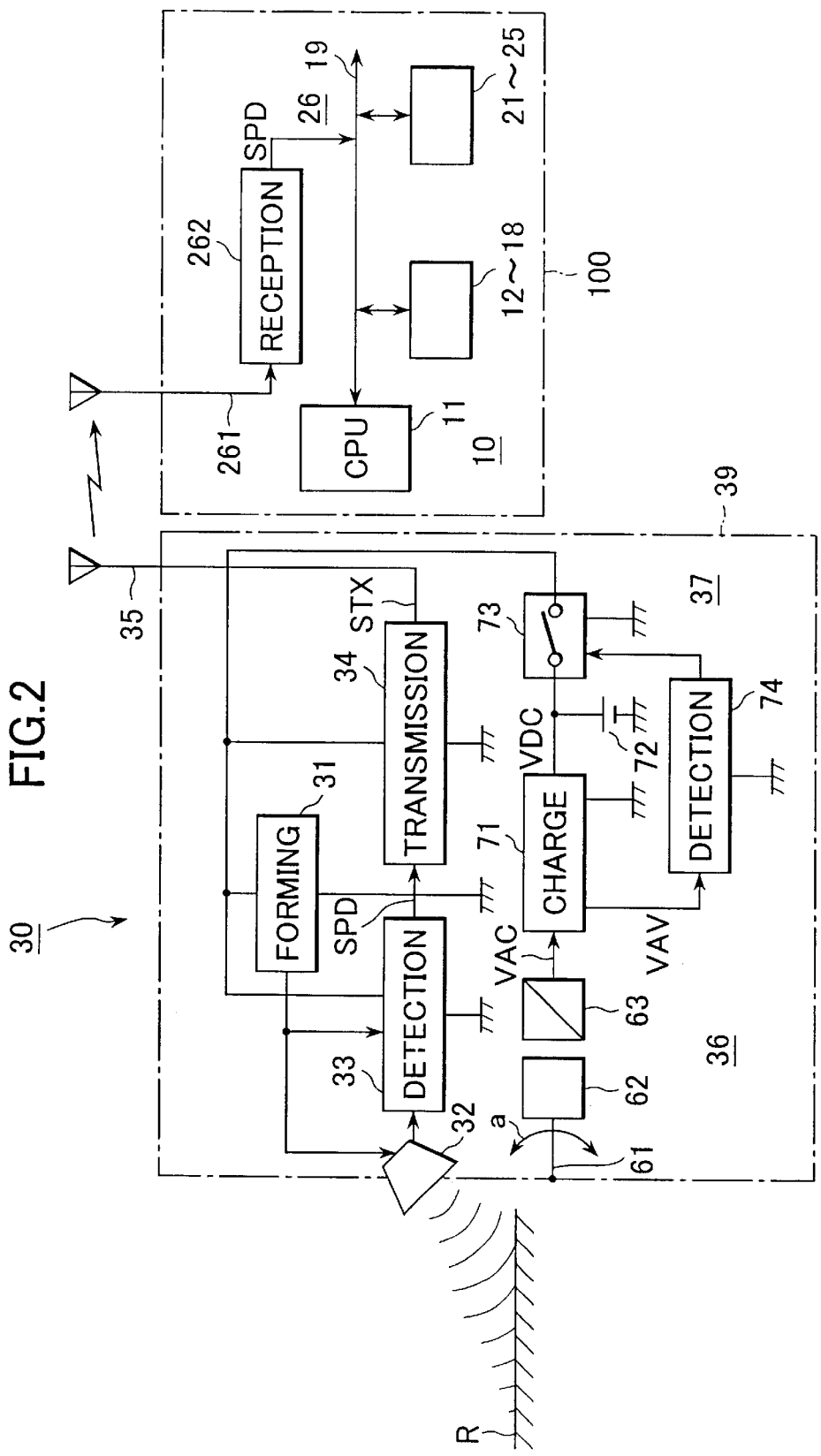
FIG. 2 is a system diagram showing an embodiment of the invention.

In FIG. 2, reference numeral 30 designates an example of a speed detecting apparatus according to the invention and reference numeral 100 designates an example of a navigation apparatus using the speed detecting apparatus. In this case, as shown by a chained line, a total of the detecting apparatus 30 is contained in one box-like member 39 and is attached to a portion of the vehicle opposed to a surface of a road on which the vehicle travels, that is, a road surface R, for example, a under surface of a floor of a vehicle body.

Further, according to the detecting apparatus 30, a signal of a millimeter wave of, for example, 70 GHz is formed by a forming circuit 31, the millimeter wave is emitted from an antenna 32 obliquely toward the road surface R, a reflected wave of the millimeter wave from the road surface R is received by the antenna 32 and a received signal thereof is supplied to a detecting circuit 33 and a detected signal SPD indicating a relative speed of the vehicle body, that is, the vehicle relative to the road surface R is outputted from the Doppler effect produced in the reflected wave.

Further, as shown in, for example, FIG. 3, the detected signal SPD is converted into a square wave signal the frequency of which is changed in proportion to the speed. Further, the detected signal SPD is supplied to a transmitting circuit 34 as a modulated signal and as shown in, for example, FIG. 3, there is formed a PAM (Pulse Amplitude Modulation) signal STX and the PAM signal STX is supplied to an antenna 35 and transmitted to the navigation apparatus 100.

Further, the detecting apparatus 30 is provided with a power generation mechanism 36. That is, a permanent magnet 62 is attached to an inner portion of the box-like member 39 by way of a spring 61 in a strip-like shape or a coil-like shape and the magnet 62 is held such that the magnet 62 can be vibrated in a direction indicated by an arrow relative to th[0085] box-like member 39. Further, a coil 63 for power generation is provided at a position opposed to the magnet 62. Therefore, when the vehicle travels, the magnet 62 is vibrated mainly in the direction indicated by an arrow by vibration of the vehicle and alternating current voltage VAC is generated in the coil 63.

Here, the alternating current voltage VAC is supplied to a power supply circuit 37. That is, the alternating current voltage VAC is supplied to a charging circuit 71 and rectified and elevated and converted into direct current voltage VDC having a predetermined magnitude, and the voltage VDC is supplied to a charging type battery 72 such as a lithium ion battery or a lithium polymer battery as charge voltage thereof. Therefore, when the vehicle travels, the voltage VAC is generated and the battery 72 is charged by the voltage VDC.

Further, the voltage VDC of the battery 72 is supplied to the circuits 32 through 34 via a switching circuit 73 for power saving as operating voltage of these. Further, voltage VAV produced by rectifying the alternating current voltage is outputted from the charging circuit 71 and the voltage VAV is supplied to a detecting circuit 74 and the magnitude of the voltage VAV is detected. Further, a detected output thereof is supplied to the switch circuit 73 as a control signal and the switching circuit 73 is turned on when VAV>VTH (VTH is predetermined voltage value) and is turned off when VAV VTH. Further, the voltage VTH is a voltage value in the case in which, for example, even when the alternating current voltage VAC is provided, the voltage VAV is low and voltage for charging the battery 72 is not provided from the charging circuit 71.

Meanwhile, according to the navigation apparatus 100, the vehicle speed sensor 26 is provided with an antenna 261 and a receiving circuit 262. Further, the signal STX transmitted from the antenna 35 is received by the antenna 261 and supplied to the receiving circuit 262, the original detected signal SPD is demodulated by and outputted from the receiving circuit 262 and the outputted signal SPD is supplied to CPU 11 via the bus 19.

Figure 1:
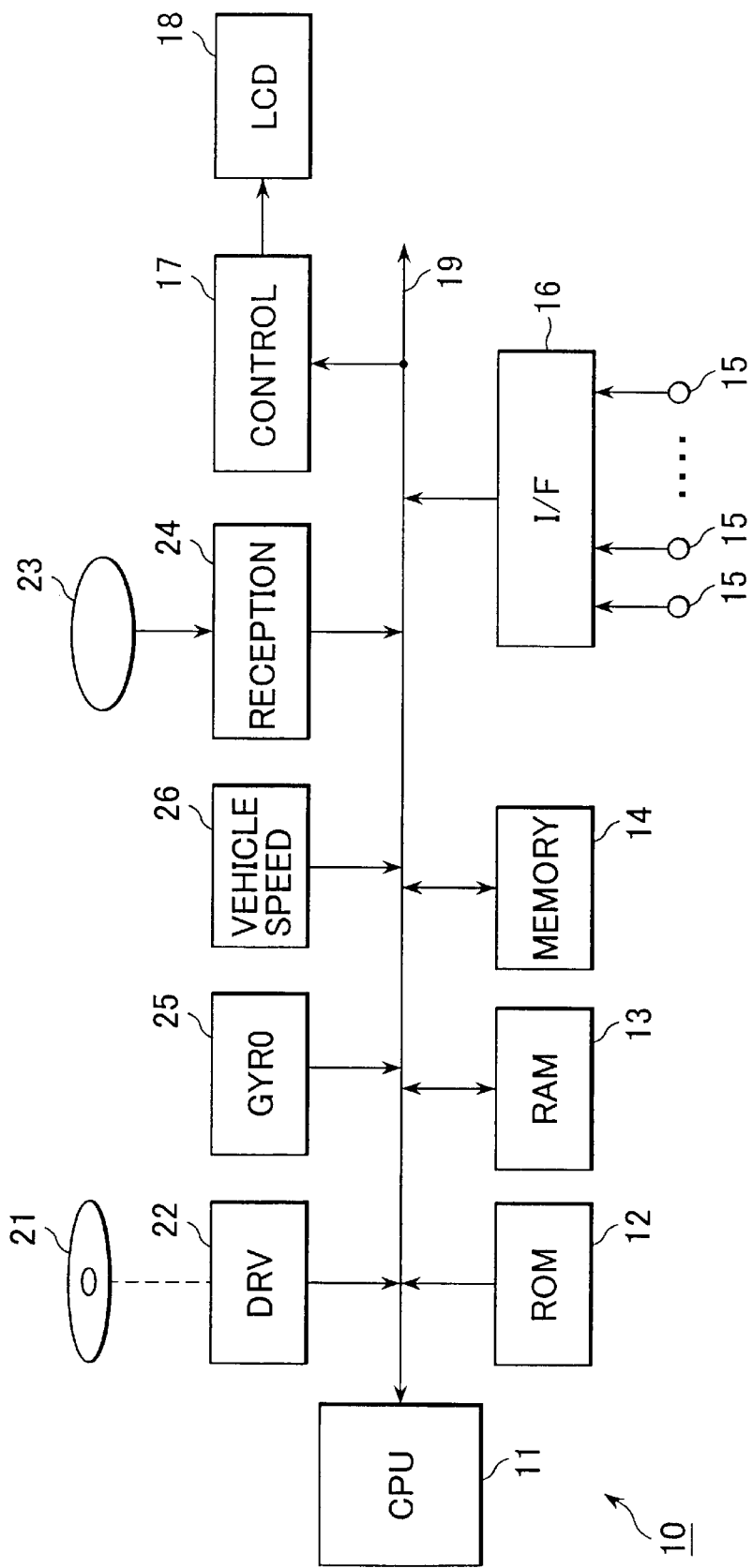
FIG. 1 is a system diagram showing a prior art.

Further, other constituent portions such as ROM 12, RAM 13 and the like are connected to the system bus 19 similar to FIG. 1 although an explanation thereof will be omitted.

Further, the navigation apparatus 100, particularly LCD 18 thereof is provided at, for example, a dashboard.

According to the constitution, when the vehicle travels, the voltage VAC is outputted from the coil 63 and when VAV>VTH, the battery 72 is charged by the charging circuit 71, the switching circuit 73 is turned on by the detected output from the detecting circuit 74 and therefore, the voltage VDC of the battery 72 is supplied to the circuits 32 through 34 by way of the switching circuit 73 as operating voltage of these.

Therefore, the detected signal SPD detecting the speed of the vehicle at this occasion is outputted from the detecting circuit 33 and the signal SPD is transmitted to the navigation apparatus 100 by the transmitting circuit 34. Further, in the navigation apparatus 100, the signal SPD transmitted from the detecting apparatus 30 is outputted from the receiving circuit 262 and is inputted to CPU 11. Therefore, the navigation apparatus 100 can be informed correctly of the traveling speed of the vehicle and can execute correct navigation.

Further, when the voltage VAC is not provided since the vehicle is disposed in a garage or a parking lot and does not travel, or even when the voltage VAC is provided, in the case in which the voltage is low and VAC≦VTH, the switching circuit 73 is turned off and accordingly, there is brought about a power saving state and the voltage VDC of the battery 72 is not consumed.

In this way, according to the above-described detecting apparatus 30, the traveling speed of the vehicle can be detected and informed to the navigation apparatus 100. At this occasion, operating voltage necessary for the detecting apparatus 30 is provided by generating power with the magnet 62 and the coil 63. Accordingly, it is not necessary to supply the operating voltage from a car battery to the detecting apparatus 30 and therefore, it is not necessary to connect a power supply cable to the detecting apparatus 30.

Further, the traveling speed detected by the detecting circuit 33 is informed to the navigation apparatus 100 by radio, and so it is not necessary to connect a cable for informing the traveling speed between the detecting circuit 33 and the navigation apparatus 100.

Therefore, it is apparent also from FIG. 2, the detecting apparatus 30 becomes wireless and therefore, when the detecting apparatus 30 is attached, time and labor for stripping an inner lining of the vehicle and finding a necessary cable from a number of similar cables, is dispensed with and the detecting apparatus 30 can simply be attached to the vehicle. That is, the box-like member 39 containing the speed detecting apparatus Further, since the attachment is simple in this way, as in a conventional navigation apparatus, the sales routes are not limited to special stores and expensive attachment fee is not needed, the detecting apparatus 30 and the navigation apparatus 100 can be sold in a general household electric appliance store and expedited to spread.

Further, since the relative speed of the vehicle is detected from the Doppler effect produced in the reflected wave of the millimeter wave and therefore, even when the vehicle is passing through a tunnel or a steel bridge or running at a vicinity of railroad, the error is not increased.

Further, although in the above-described, the speed of the vehicle is detected by using the millimeter wave, electromagnetic wave such as light, ultrasonic wave or the like can also be used. Further, when VAV≦VTH, in the case in which the switching circuit 73 is not immediately turned off and the state of VAV≦VTH continues over a predetermined time period, the switch circuit 73 can be turned off. Similarly, in the state of VAV>VTH continues over a predetermined time period, the switching circuit 73 can be turned on.

Further, ON/OFF of the switching circuit 73 may be provided with a hysteresis characteristic and when VAV≦VTH1, the switching circuit 73 can be turned off and when VAV>VTH2 (VTH2>VTH1), the switching circuit 73 can be turned on.

Further, although according to the above-described power generation mechanism 36, power is generated by vibration of the magnet 62 in the vertical direction, power can be generated also by vibration in a horizontal direction or a front and rear direction. Further, power can be generated by increasing the vibration of the magnet 62 by using gears or the like.

What is claimed is:

1. A detecting apparatus of vehicle speed comprising:

detecting means for emitting an electromagnetic wave or an ultrasonic wave to a road surface and detecting traveling speed of a vehicle from the Doppler effect produced in a reflected wave thereof;

a transmitting circuit for sending information about the traveling speed detected by the detecting means by radio;

a power generation mechanism for generating power by vibration produced in said vehicle; and a charging circuit for charging a charging type battery by an output voltage of the power generation mechanism.

2. The detecting apparatus of vehicle speed according to claim 1, wherein voltage of said charging type battery is supplied to said detecting means and said transmitting circuit as operating voltage thereof.

3. The detecting apparatus of vehicle speed according to claim 2, further comprising:

a switching circuit; and a detecting circuit for detecting a magnitude of the output voltage of said power generation mechanism, wherein said switching circuit is connected in series with the charging type battery and a voltage line between said detecting means and said transmitting circuit, an output of said detecting circuit is supplied to said switching circuit as a control signal thereof, and when the magnitude of the output voltage of said power generation mechanism is equal to or lower than a predetermined value, said switching circuit is turned off.

4. The detecting apparatus of vehicle speed according to claim 3, wherein a hysteresis characteristic is provided to on/off of said switching circuit.

* * * * *